J. H. BUSCHER.
Farm Gate and Hanger.

No. 202,328.          Patented April 16, 1878.

Fig. II

Fig. III

WITNESSES
D. P. Cowl
L. Bacon

INVENTOR
John H. Buscher
by W. Morris Smith
atty.

UNITED STATES PATENT OFFICE.

JOHN H. BUSCHER, OF OTTAWA, OHIO.

IMPROVEMENT IN FARM-GATES AND HANGERS.

Specification forming part of Letters Patent No. 202,328, dated April 16, 1878; application filed February 6, 1878.

*To all whom it may concern:*

Be it known that I, JOHN HENRY BUSCHER, of Ottawa, in the county of Putnam and State of Ohio, have invented an Improvement in Farm-Gates and their Hangers, of which the following is a specification:

In gates as heretofore hung to open in a similar manner to this too much dependence has been placed upon the balancing of the gate upon its hanger when half open to insure its clearing the ground when swung around. This cannot be relied upon in all weathers, as the variable quantity or quality of material in the different portions of the gate will absorb more or less moisture in wet weather, more mud may be splashed upon one portion than another, or from various other causes the equipoise of the gate may be destroyed.

This invention is designed to overcome these difficulties; and it consists in a novel construction of hanger, whereby the gate is held in a horizontal position while it is being opened to about half its length, and retained in such position while being swung around to obtain the full width of its opening, without risk of its dragging on the surface of the ground.

The invention is fully described, as follows, by reference to the accompanying drawing, in which—

Figure 1:
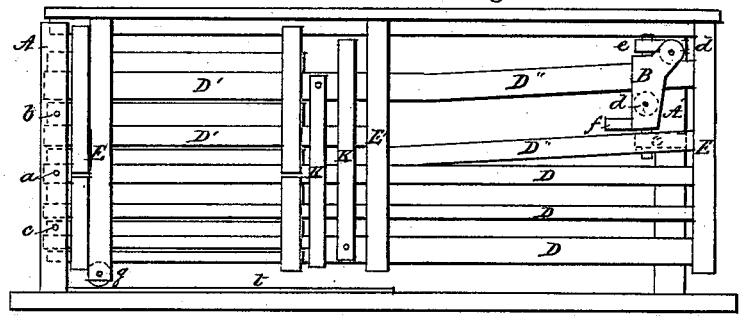
Figure 1:
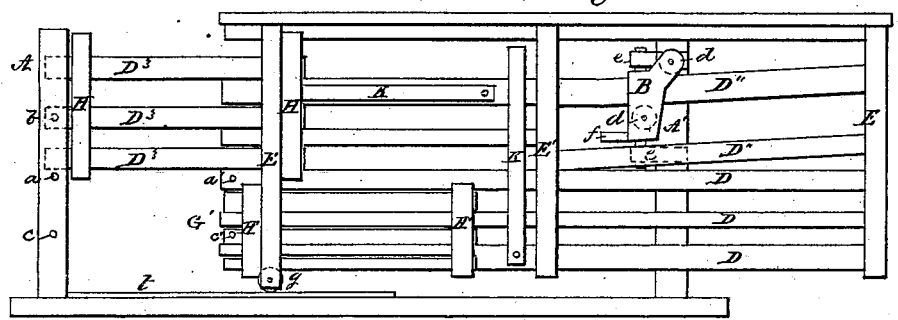
Figure 1:
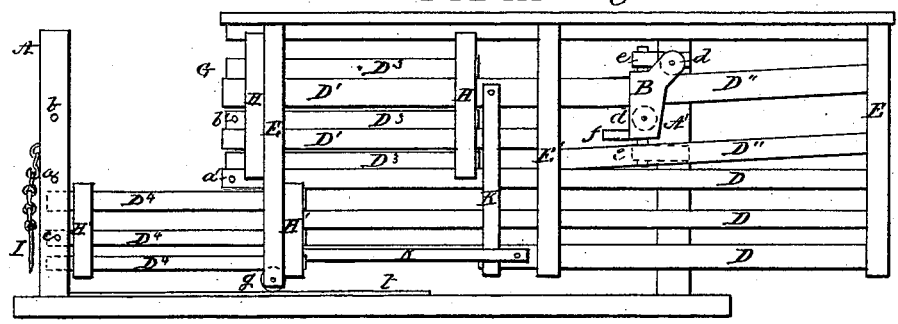

Figure 1 represents the gate as fully closed; Fig. 2, as in position to allow hogs to pass through, but to stop oxen or horses; Fig. 3, as in position to allow the passage of the latter, but to stop the former.

The same letter appearing on the several figures indicates corresponding parts.

In the drawing, A represents the gate-posts; B, the hanger, and C the gate. The latter is composed of a number of parallel bars, D, extending its entire length; others, D', extending about half its length; and two bars, D'', arranged on an incline, extending also about half its length. These series of bars are connected at the extreme ends of the gate by vertical posts or clamping-pieces E, and at about their mid-length by a similar post or clamping-piece, E'.

The forward end of this gate is provided with two sliding sections, G and G', the former having its bars D$^3$ meshing with the bars D' of the gate, and the latter having its bars D$^4$ meshing with the bars D of the gate. The bars of each of said sections are connected by vertical clamping-pieces H and H', respectively.

Thus it will be seen that the sliding section D$^3$ may be extended beyond the length of the gate proper, so as to form a connection with the post A, and to leave an opening beneath it for the passage of hogs or other small animals, as represented in Fig. 2; and that by the extension of the sliding section D$^4$ (the one D$^3$ being receded within the body of the gate) a fence will be obtained to prevent the passage of hogs, while oxen or horses are free to step over it.

Attached to the post A by means of a chain is a locking-pin, I, which, to retain the gate entirely closed, is inserted in the hole $a$ in the post, and passes through a corresponding hole, $a'$, in the central bar D of the gate. If it is desired to allow the passage of hogs, the pin I is withdrawn and inserted in the hole $b$ in the post, passing through the hole $b'$ in the central bar of the sliding section D$^3$, when the gate, with the sliding section D$^4$, may be run back, leaving an opening at bottom, through which small animals may pass; and, if it is desired to confine the hogs, the pin I may be inserted in the hole $c$ in the post, and passing through the hole $c'$ in the central bar of the section D$^4$, when the gate, with the sliding section D$^3$, may be run back, leaving a low fence to confine hogs, but such that oxen or horses may readily step over.

These sections are furthermore retained in such positions, with respect to the body of the gate, by either one or other of the stop-bars K being turned on its pivot from a vertical position, as represented in Fig. 1, to a horizontal one, abutting against the end of its respective section, as represented in Figs. 2 or 3.

This gate is furthermore supported by a swinging hanger, B, which is pivoted to the post A' in suitable bearings $e$. In this hanger are two rollers, $d$, one below and the other above the bar D'' of the gate, the upper one of which is arranged vertically to the rear of the lower one, to prevent the gate from dragging on the ground when being swung open; and, as a further security against this dragging, the hanger is provided with a prong or tongue, $f$, which enters a mortise in the upright E' of the gate. The bars D'' of the gate are arranged on an incline, so as to lift the gate clear of the ground; and to relieve the hanger of any great strain when the gate is only partially opened, a roller, $g$, is provided in the foot of the front post E, which runs on a plank or tramway, $t$, arranged on the ground, to support it.

What is here claimed as new, and desired to be secured by Letters Patent, is—

1. The swinging hanger B, having its upper roller arranged above and to the rear of the lower one, as and for the purpose set forth.

2. The tongue $f$, in combination with the hanger B and mortise in post E, substantially as and for the purpose specified.

JOHN HENRY BUSCHER.

Witnesses:
  L. LEHMKUHLE,
  WILLIAM ALT.